(12) United States Patent
Kaga et al.

(10) Patent No.: US 8,957,764 B2
(45) Date of Patent: *Feb. 17, 2015

(54) DATA WRITING APPARATUS WRITING DATA TO WIRELESS IC TAGS

(75) Inventors: Kikuo Kaga, Tokyo (JP); Shigeo Azhizawa, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 495 days.
This patent is subject to a terminal disclaimer.

(21) Appl. No.: 13/380,081

(22) PCT Filed: Jul. 23, 2010

(86) PCT No.: PCT/JP2010/062862
§ 371 (c)(1),
(2), (4) Date: Dec. 22, 2011

(87) PCT Pub. No.: WO2011/013784
PCT Pub. Date: Feb. 3, 2011

(65) Prior Publication Data
US 2012/0092138 A1 Apr. 19, 2012

(30) Foreign Application Priority Data
Jul. 27, 2009 (JP) ................................. 2009-174110

(51) Int. Cl.
*H04Q 5/22* (2006.01)
*G06K 19/077* (2006.01)
*B28B 23/00* (2006.01)

(52) U.S. Cl.
CPC ...... *G06K 19/07758* (2013.01); *B28B 23/0031* (2013.01)
USPC ........ 340/10.51; 340/435; 340/438; 340/904; 340/905; 340/933

(58) Field of Classification Search
CPC ..... G08G 1/166; G08G 1/167; G08G 1/0967; G08G 1/096716; G08G 1/16; B60Q 1/00; B60Q 9/008; B60Q 1/525; B60Q 5/006; B60Q 5/008; G06K 7/10366; G06K 19/0723; G06K 7/10009; B60K 35/00; B60K 2350/352; B60K 2350/1064; B60K 37/02; B60W 50/14; B60W 2050/146; B60W 30/06
USPC ............... 340/10.51, 435, 438, 904, 905, 933
See application file for complete search history.

(56) References Cited

U.S. PATENT DOCUMENTS

2008/0067228 A1* 3/2008 Kaga et al. .................... 235/375
2008/0252483 A1* 10/2008 Hodges ........................ 340/905

FOREIGN PATENT DOCUMENTS

| JP | 2006-145385 | 6/2006 |
| JP | 2008-063900 | 3/2008 |
| JP | 2008-182577 | 8/2008 |

OTHER PUBLICATIONS

International Search Report issued Sep. 14, 2010 in International (PCT) Application No. PCT/JP2010/062862.

*Primary Examiner* — George Bugg
*Assistant Examiner* — Sharmin Akhter
(74) *Attorney, Agent, or Firm* — Wenderoth, Lind & Ponack, L.L.P.

(57) ABSTRACT

An apparatus e firmly writes data to wireless IC tags and embeds the wireless IC tags having been written with data to the object to be embedded. The data writing apparatus includes a radio communication means for writing data to wireless IC tags through radio communication and a wireless IC tag charging member for embedding the wireless IC tags having been written with data to the object to be embedded with wireless IC tags being received in a mixing/kneading tank in the liquid, viscous or semisolid state. The radio communication means writes data to the wireless IC tags and the wireless IC tags having been written with data are embedded to the object to be embedded with wireless IC tags through the wireless IC tag charging member.

17 Claims, 15 Drawing Sheets

DATA WRITING APPARATUS WRITING DATA TO WIRELESS IC TAGS

BACKGROUND OF INVENTION

1. Field of the Invention

The present invention is related to a data writing apparatus which writes data to wireless identification tags, particularly to a data writing apparatus for writing data to wireless IC tags, which is used for a product management system carrying out writing and reading data between wireless IC tags in order to manage products, and which writes data on products such as unhardened concrete and thermoplastic resins, which present in liquid, viscous or semisolid state during the manufacturing process, to wireless IC tags and embed them to the products.

2. Prior Art

In recent years, in the field of the architectural structures made of concrete, a management system where wireless IC tags, to which product information has been or will be written in view of inspecting records with regard to investigation on earthquake-proof strength, constructions and the like, are embedded in those concrete structures in order to manage the quality of concrete, records of constructions, etc. using the information written in the wireless identification tags has been known, and some inventions as to such sort of systems have been reported. In addition, further requests, without limitation to those concrete structures, that desire to carryout such management using wireless identification tags even for movables such as resin moldings and the like in view of traceability have been raised.

With regard to products, such as unhardened concrete and thermoplastic resins, those which present in liquid, viscous or semisolid state during the manufacturing process, it is possible to write/read various data through radio communication with wireless identification tags having been embedded in a hardened product by writing various data into wireless IC tags beforehand and embedding the wireless IC tags having been written with data inside the product, and it can be useful for product management for product by product. Further, embedding of the wireless IC tags inside the product is advantageous because it is not required to embed or stick those wireless IC tags to the product afterwards.

For example, a quality control method, wherein wireless IC tags are embedded to unhardened concrete on a vehicle equipped with a concrete mixer, information on the unhardened concrete is written to those wireless IC tags at the time that the unhardened concrete is casted to build a structure, and the wireless IC tags are incorporated in the concrete structure, has been proposed (see Patent Document 1). Further, a quality management system for concrete materials using wireless IC tags, wherein wireless IC tags are embedded to unhardened concrete during the manufacturing process of the unhardened concrete, and the unhardened concrete so produced have been proposed (see Patent Document 2).

Each of the quality management systems described above is a system, wherein wireless IC tags are embedded to unhardened concrete beforehand, information on the unhardened concrete, the casting and the concrete structure after the casting are written to the wireless IC tags, and data comprising the information are read upon requirement. In these quality management systems, however, the details as to the constitution of the data writing apparatus that writes data to the wireless IC tags are not disclosed.

[Patent Document 1]: Japanese Unexamined Patent Application Publication No. 2006-145385

[Patent Document 2]: Japanese Unexamined Patent Application Publication No. 2008-63900

SUMMARY OF INVENTION

Therefore, it is an object of the present invention to provide an apparatus which firmly writes data to wireless IC tags to be directly embedded to a product for carrying out the quality control and firmly embed the wireless IC tags, to which the data have been written, to the object to be embedded.

In order to achieve the object described above, the data writing apparatus for writing data to wireless IC tags according to the present invention includes a radio communication means for writing data to wireless IC tags through radio communication and a wireless IC tag charging member for embedding the wireless IC tags having been written with data to an object to be embedded with wireless IC tags being in the liquid, viscous or semisolid state and received in a mixing vessel, and it is characterized that the radio communication means writes data to the wireless IC tags, and that the wireless IC tags having been written with data are embedded to the object to be embedded with wireless IC tags by means of the wireless IC tag charging member.

The object to be embedded with wireless IC tags is characterized that it consists of unhardened concrete being received in a mixing/kneading tank, which is produced by mixing/kneading cement, water and aggregate.

The data writing apparatus according to the present invention is characterized in that a passage for guiding the wireless IC tags to the data writing region of the radio communication means and the wireless IC tag charging member in this order is arranged in the apparatus.

The data writing apparatus according to the present invention is further characterized in that a hopper section for receiving the wireless IC tags is installed to the apparatus, and the wireless IC tags received inside the hopper section are released therefrom to the passage.

The data writing apparatus according to the present invention is further characterized in that a cylinder having a diameter through which the wireless IC tag may pass is installed in the passage, so that the wireless IC tags are guided toward the data writing region of the radio communication means and a given quantity of the wireless IC tags are transferred on every occasion to the data writing region by varying the air pressure inside the cylinder by means of an air control means.

The data writing apparatus according to the present invention is still further characterized in that a passage opening/closing member is provided in the passage for guiding the wireless IC tags to the wireless IC tag charging member, and that the wireless IC tags having been written with data are intercepted in the data writing region by closing the passage opening/closing means of the radio communication means so that the wireless IC tags are written with data, and, on the other hand, the wireless IC tags having been written with data are embedded to the wireless IC tag charging member by opening the passage opening/closing member.

The data writing apparatus according to the present invention is still further characterized in that the wireless IC tag charging member is arranged beneath the apparatus and is consisting of a tag reception server for receiving the wireless IC tags having been written with data being released from the passage and a charging pore having an opening in the bottom of the tag reception server, and that the wireless IC tags having been written with data embedded by virtue of their own weight from the charging pore to the object to be embedded with wireless IC tags, locating beneath the wireless IC tag charging pore.

The data writing apparatus of the present invention is still further characterized in that an air interception means for preventing reverse pressure from occurring is provided to the wireless IC tag charging pore.

The data writing apparatus of the present invention is still further characterized in that the radio communication means is a non-contact type radio communication unit which is constituted so as to be electrically connected to a database and a control means either with or without wires, the control means outputs signals to the radio communication means when the arrival of the wireless IC tags to the data writing region is determined by a detecting means, and the radio communication means that received the signals from the control means outputs radio waves in the range of a preset frequency band to the antenna section to carry out radio communication so that product information data stored in the database is written to the wireless IC tags.

The data writing apparatus of the present invention is still further characterized in that the radio communication means is a non-contact type radio communication unit, which is so constituted that it is electrically connected to a database, in which information on unhardened concrete transmitted from a measuring apparatus for measuring the property of unhardened concrete are stored, and a control means either with or without wires, the control means outputs signals to the radio communication means when the arrival of the wireless IC tags to the data writing region is detected by the detecting means, and the radio communication means that received signals from the control means outputs radio waves in the range of a preset frequency band to the antenna section to carry out radio communication so that the unhardened concrete information data stored in the database is written to the wireless IC tags.

The data writing apparatus of the present invention is still further characterized in that a data writing error detection means for detecting if there is a data writing error in the wireless IC tags or not is arranged, a selecting means for selecting the wireless IC tags with data writing error is arranged in the passage downstream of the data writing error detection means, and the wireless IC tags with data writing error are evacuated by the selecting means to the evacuation section when data writing error in the wireless IC tag is detected by the data writing error detection means.

The data writing apparatus of the present invention is still further characterized in that a counter is arranged in the passage so that the number of the wireless IC tags passing through the passage may be counted.

The data writing apparatus of the present invention is still further characterized in that the counter comprises a rotary counter which feeds a given number of the wireless IC tags to the passage on every rotation, or a photo-interrupter which detects the passing of the wireless IC tags.

The data writing apparatus of the present invention is still further characterized in that a caster for horizontally adjusting the position of the charging pore of the wireless IC tag charging member and/or an adjuster for vertically adjusting the position of the charging pore of the wireless IC tag charging member is arranged in the bottom section of the data writing apparatus.

The data writing apparatus of the present invention is still further characterized in that the control means comprises a sequence control unit, and the operations of the radio communication means, the release section, the cylinders and the passage opening/closing means are controlled on the basis of the controlled operation inputted to the sequence control unit.

The data writing apparatus of the present invention is still further characterized in that it includes a hopper section, a release section for releasing the wireless IC tags from the hopper section, a plurality of radio communication means and a passage comprising a plurality of lines corresponding to the number of the radio communication means, the plurality of radio communication means writes data through radio communication to the wireless IC tags having been guided to the data writing region on the basis of the output signals generated from the control means, and the wireless IC tag charging member embeds the wireless IC tags having been written with data to the object to be embedded with wireless IC tags.

The data writing apparatus of the present invention is still further characterized in that the wireless IC tags to be introduced by the wireless IC tag charging member are wireless IC tags capable of writing and reading data through radio communication between themselves and the radio communication means, a ferroelectric memory using an electric including a power source section for receiving radio waves from the radio communication means and resonating with the waves to generate current and an antenna section for performing radio communication at a given frequency bandwidth are mounted on the substrate of each wireless IC tag, the wireless IC tags are configured to store the data in the ferroelectric memory, and the radio communication means is a radio communication unit which outputs radio waves being in the range of the communication frequency band to be used for the wireless IC tags.

The data writing apparatus of the present invention is still further characterized in that the wireless IC tags to be embedded by the wireless IC tag charging member are wireless IC tags capable of writing and reading data through radio communication between themselves and the radio communication means, a ferroelectric memory using an electric including a power source section for receiving electric waves from the radio communication means and resonating with the waves to generate current and an antenna section for performing radio communication being in the range of a given frequency band and a UHF range communication antenna chip for receiving electric waves being in the range of UHF bandwidth are electrically connected and mounted on the substrate of each wireless IC tag, communication at a long frequency band exceeding UHF band is carried out with the antenna section of the ferroelectric memory to thereby store data in the ferroelectric memory, communication at UHF band is carried out with the antenna chip to be used for UHF band, the wireless IC tags are configured to store the data in the ferroelectric memory, and the radio communication means is a radio communication unit that outputs at least radio waves being in the range of UHF band.

The data writing apparatus of the present invention is still further characterized in that the wireless IC tag to be introduced by the wireless IC tag charging member is molded in any shape selected from a group consisting of polyhedral, spherical, elliptic and bale-shaped, so that it can roll and move freely.

With the constitutions as described above, the data writing apparatus for writing data to wireless IC tags according to the present invention include a radio communication means for writing data to wireless IC tags through radio communication and a wireless IC tag charging member for embedding the wireless IC tags having been written with data to an object to be embedded with wireless IC tags being in the liquid, viscous or semisolid state and received in a mixing/kneading tank, the radio communication means writes data to the wireless IC tags, and the wireless IC tags having been written with data are embedded to the object to be embedded with wireless IC tags by means of the wireless IC tag charging member, and therefore, a series of processes including writing data such as product information to the wireless IC tags and embedding the wireless IC tags to the product can be accomplished promptly and firmly using a single apparatus. And, by embedding the wireless IC tags having been written with the product information to the object to be embedded with wireless IC tags, that is the product, product management for the object to be embedded with wireless IC tags by using reader/writers can be achieved more easily and firmly.

Since the object to be embedded with wireless IC tags comprises unhardened concrete prepared by mixing/kneading cement, water and aggregate and received in a mixing tank, it is possible to promptly and firmly embed wireless IC tags into the unhardened concrete. And, by reading/writing data from/to the wireless IC tags, it is made possible to control and maintain the unhardened concrete and structures made by casting the unhardened concrete simply and firmly. As a result, it is further made possible to carry out the control and diagnosis of the earthquake-proof strength and the administration of the construction records to thereby provide safe concrete structures.

The arrangement of the passage which guides the wireless IC tags to the data writing region of the radio communication means and the wireless IC tag charging member in this order enables data writing and embedding of the wireless IC tags in turn by just rendering the wireless IC tags to pass through the passage, which further enables to carryout a series of processes, namely the data writing and the embedding of the wireless IC tags to the object to be embedded with wireless IC tag, promptly and firmly.

The arrangement of the hopper section for storing the wireless IC tags and the release of the wireless IC tags having been stored in the hopper section from the hopper section to the passage enable to prepare a number of wireless IC tags being in the initial condition beforehand, and to feed the wireless IC tags to the radio communication means securely to thereby perform secure data writing in the radio communication means.

Besides, the arrangement of a cylinder having a diameter through which the wireless IC tag may pass in the passage which guides the wireless IC tags to the data writing region of the radio communication means and the feeding of a given portion of the wireless IC tags to the data writing region by varying the air pressure in the cylinder by means of an air control means enable to firmly feed a given portion of the wireless IC tags to the data writing region of the radio communication means on every occasion by virtue of the air pressure change without using a complex delivering mechanism, which further allows to execute secured data writing in the radio communication means.

Besides, the passage opening/closing member is arranged in the passage which guides the wireless IC tags to the wireless IC tag charging member so that the wireless IC tags may be intercepted in the data writing region of the radio communication means by closing the passage opening/closing member in order to carry out data writing, and the wireless IC tags having been written with data may be released to the wireless IC tag charging member by opening the passage opening/closing member and then temporarily intercepted in the data writing region in order to carry out data writing securely. Further, the wireless IC tags having been written with data may be released to the wireless IC tag charging member at a prefixed timing to thereby distribute them evenly in the object to be embedded with wireless IC tags.

The wireless IC tag changing member is arranged beneath the data writing apparatus and comprises a tag reception server for receiving the wireless IC tags having been written with data which are released from the passage and a charging pore having an opening in the bottom of the tag reception server, and the wireless IC tags having been written with data can be firmly embedded to the object to be embedded with wireless IC tags without using a complex charging mechanism, by causing the wireless IC tags having been written with data to fall by virtue of their own weight from the charging pore to the object to be embedded with wireless IC tags which locates beneath the wireless IC tag charging pore.

Further, the wireless IC tags having been written with data may be securely embedded into the object to be embedded with wireless IC tags without causing the reverse flow and scattering by virtue of arranging an air interrupter for preventing the occurrence of reverse pressure to the wireless IC tag charging pore.

The radio communication means is configured to be electrically connected to a database and a control means either with or without wires. When the arrival of the wireless IC tags to the data writing region is detected by a detection means, the control means outputs signals to the radio communication means. Since the radio communication means having received the signals from the control means is a non-contact type radio communication unit which outputs radio waves in the range of a preset frequency band to carry out radio communication to the antenna section of the wireless IC tag to thereby write the product information data being stored in the database, it is possible to securely write the product information data as to the object to be embedded with wireless IC tags to the wireless IC tags.

The radio communication means is configured to be electrically connected to a database in which unhardened concrete information transmitted from a measuring apparatus for measuring the property of the unhardened concrete and to a control means either with cables or in a wireless manner. When the arrival of the wireless IC tags to the data writing region is detected by a detection means, the control means outputs signals to the radio communication means. Since the radio communication means having received the signals from the control means is a non-contact type radio communication unit which outputs radio waves being in the range of a preset frequency band to carry out radio communication to send the unhardened concrete information data stored in the database to the antenna section of the wireless IC tags, thereby writing the unhardened concrete information data into the wireless IC tags, it is possible to carry out promptly a series of processes, namely the measurement of the property of the unhardened concrete to be embedded and writing of the product information data of the unhardened concrete to the wireless IC tags so that the control of the unhardened concrete may be secured.

It is possible to eliminate defective wireless IC tags with data writing errors before embedding to thereby embed only sound wireless IC tags having been written with data by arranging a data writing error detection means for detecting if no error is caused in data writing to the wireless IC tags, and by further arranging a selection means for selecting wireless IC tags with data writing errors in the passage downstream of the data writing error detection means, and evacuating the wireless IC tags with data writing errors to the evacuation section by means of the selection means upon detection of the data writing errors in the wireless IC tags by the error detection means, elimination of the defective wireless IC tags with data writing errors before embedding and embedding of only sound wireless IC tags having been written with data may be achieved. Thus, with this configuration, it is made possible to execute the secure management of the product.

Further, it is possible to count the number of the wireless IC tags to be embedded and to adjust the number of the wireless IC tags depending on the quantity and type of the object to be embedded with wireless IC tags, by setting a counter to the passage to thereby count the number of the wireless IC tags which have passed through the passage.

For the counter, a rotary counter that feeds a 0ed number of the wireless IC tags to the passage on every rotation, or a photo-interrupter for detecting passing of the wireless IC tags is used so that the number of the wireless IC tags passing by the counter can be counted securely.

In the bottom of the data writing unit, a caster for adjusting the position of the wireless IC tag charging pore in the horizontal direction and/or an adjuster for adjusting the position of the charging pore in upward/downward directions are arranged so that the charging pore can be accurately aligned against the object to be embedded with wireless IC tags, and the wireless IC tags can be embedded into the object securely.

A sequence control unit is used as the control means, and based on the controlled operation inputted to the sequence control unit, the operations of the radio communication means, the release section, the cylinders and the passage opening/closing means are controlled to input the operation program for the data writing apparatus for writing data into the wireless IC tags from a computer or the like to the sequence control unit. With this configuration, feeding of the wireless IC tags and the data writing can be carried out as a series of operations by controlling the sequence control unit, and the data writing and embedding of the wireless IC tags to the object to be embedded with wireless IC tags may be achieved promptly and easily.

The data writing apparatus of the present invention includes a hopper section, a release section for releasing the wireless IC tags from the hopper section, a plurality of radio communication means and passages consisting of plural lines corresponding to the number of the radio communication means. The plurality of radio communication means write data through radio communication to a plurality of wireless IC tags having been guided to the data writing region based on the signals output from the control means, and the wireless IC tag charging member is characterized in that it embeds the wireless IC tags having been written with data to the object to be embedded with wireless IC tags. With the configuration described above, a plurality of wireless IC tags may be embedded at once into the object to be introduced, and the operations of data writing into the wireless IC tags and the embedding of the wireless IC tags to the object may be achieved promptly.

The wireless IC tags to be embedded by the wireless IC tag charging member is a wireless IC tag capable of writing and reading data through radio communication between itself and a radio communication means. It is not required for the wireless IC tag to be provided with an electric power source, and data with a large capacity may be written to the wireless IC tag, by mounting a ferroelectric memory on the substrate of the wireless IC tag, the memory uses a ferroelectric including an electric power source section for receiving radio waves from the radio communication means and resonate with the radio waves to thereby generate current, and an antenna section for executing radio communication in a preset frequency bandwidth, configuring the wireless IC tags so as to store the data in the ferroelectric memory, and configuring the radio communication unit to output radio waves being in the range of the communication frequency band to be used for the wireless IC tags. Further, with this configuration, data can be written without contacting the radio communication means to the wireless IC tags, but by rendering the wireless IC tags just passing in the vicinity of the radio communication means.

The wireless IC tag which is embedded by the wireless IC tag charging member is a wireless IC tag capable of writing and reading data through radio communication between itself and the radio communication means. In the wireless IC tag, a ferroelectric memory which uses a ferroelectric including an electric power source section for receiving electric waves from the radio communication means and resonate with the waves to thereby generate current and an antenna section for executing radio communication in the range of a preset frequency bandwidth, and a UHF band communication antenna chip for receiving electric waves in the range of UHF bandwidth are electrically connected and mounted on the substrate of the wireless IC tag. The communication at a longer frequency band exceeding the UHF band is carried out with the antenna section of the ferroelectric memory to store data in the ferroelectric memory, and the communication at the UHF band is carried out with the antenna chip for the UHF band communication use. The wireless IC tag is configured so as to store the data in the ferroelectric memory. A radio communication unit outputting at least radio waves being in the range of UHF band is used as the radio communication means. With the configuration described above, data writing by using radio waves being in the range of UHF band having relatively wide communication range can be done, and it is possible to securely write data to the wireless IC tag even when the wireless IC tags pass in the vicinity of the radio communication means at a relatively fast speed.

By molding the wireless IC tag to be embedded by the wireless IC tag charging member in a shape capable of freely rolling and moving, being selected from a group consisting of polygonal, spherical, elliptic and bale-shaped, it can pass and roll through the passage smoothly by virtue of its own weight and will not be intercepted in the passage. Also, it has good affinity with the object to be embedded with wireless IC tags after it has been embedded to the object.

DESCRIPTION OF THE REFERENCE NUMERALS

Figure 1:
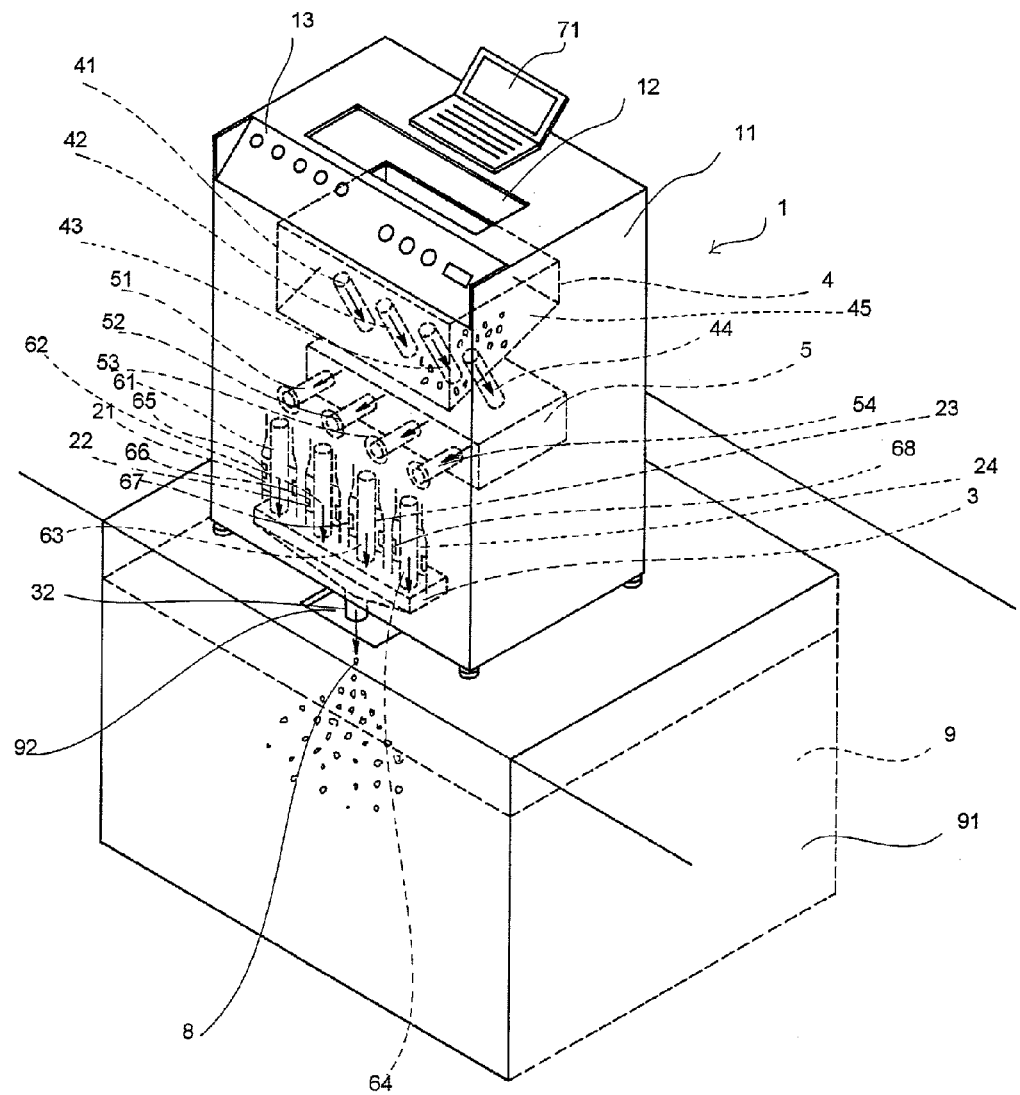
FIG. 1 A schematic perspective view of a data writing apparatus for writing data to wireless IC tags according to the present invention.

1. Data writing apparatus
11. Casing
12. Pore section
13. Operation panel
130. Start switch
131. Stop switch
132. Reset switch
133. Shutter switch
134. Hopper switch
135. Motor switch
136. Evacuation shutter switch
137. Cylinder switch
138. Origin restoring switch
139. Auto/manual convert switch
14. Signal tower
141. Green lamp
142. Yellow lamp
143. Red lamp
144. Pole
145. Emergent suspension switch
15. Door
16. Lid section
161. Hinge
171. Caster
172. Caster
173. Adjuster
174. Adjuster
175. Caster
176. Caster
177. Adjuster
178. Adjuster
181. Air regulator
182. Electric power source supply section
183. Connector
184. Connector
185. Relay panel
186. Air valve
2. Reader/writer
21. Reader/writer
22. Reader/writer
23. Reader/writer
24. Reader/writer
3. Wireless IC tag charging member
31. Tag reception server
32. Charging pore
34. Evacuation section
35. Outlet
4. Hopper section
41. Release section
42. Release section
43. Release section
44. Release section
5. First passage
51. Cylinder
52. Cylinder
53. Cylinder
54. Cylinder
61. Second passage
62. Second passage
63. Second passage
64. Second passage
65. Sensor
66. Sensor
67. Sensor
68. Sensor
7. Sequence control unit
71. Computer
72. Computer connection section
8. Wireless IC tag
81. Coverture
82. Concave point
83. Wireless IC tag chip
84. FeRAM chip
85. UHF antenna chip
86. Substrate
87. Cover
9. Unhardened concrete
91. Mixing/kneading tank
92. Inlet

DETAILED DESCRIPTION OF THE INVENTION

Figure 2:
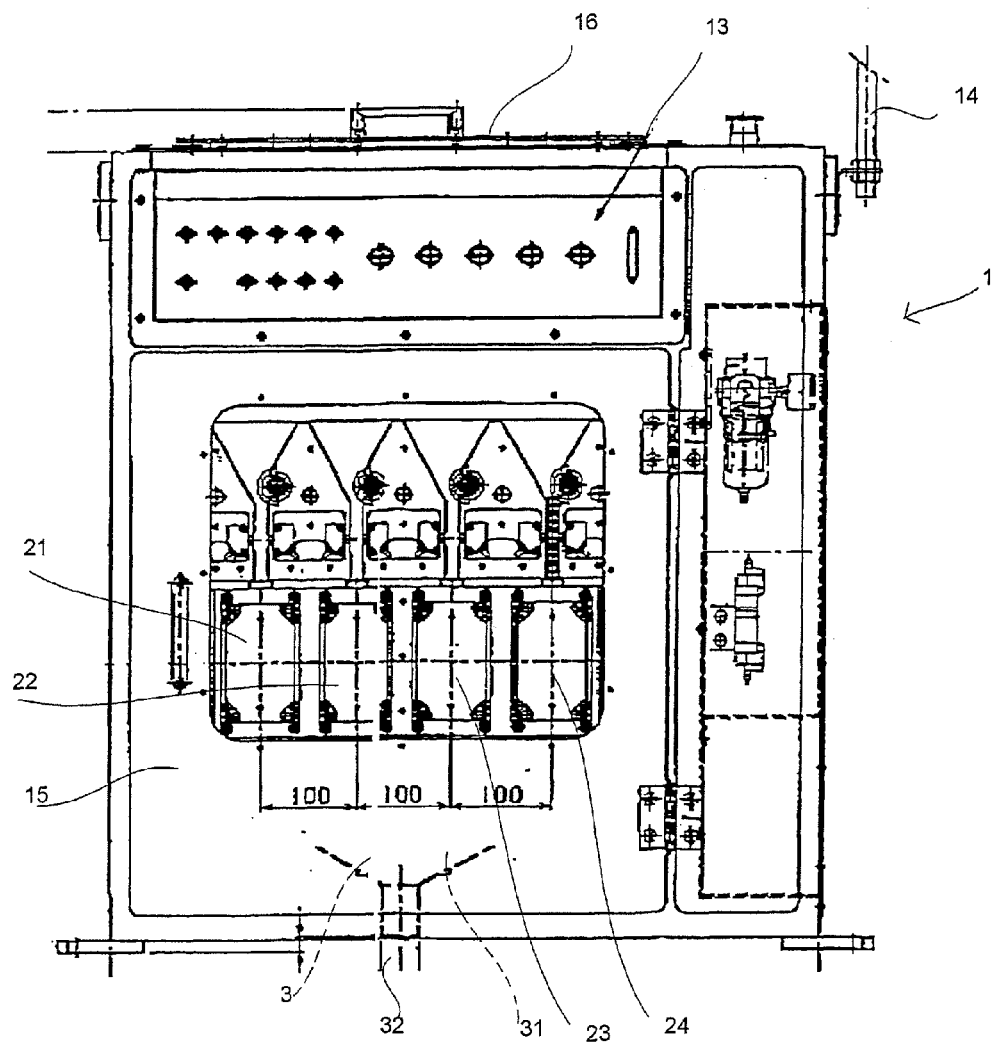
FIG. 2 A front view of a data writing apparatus according to an embodiment of the present invention.
Figure 3:
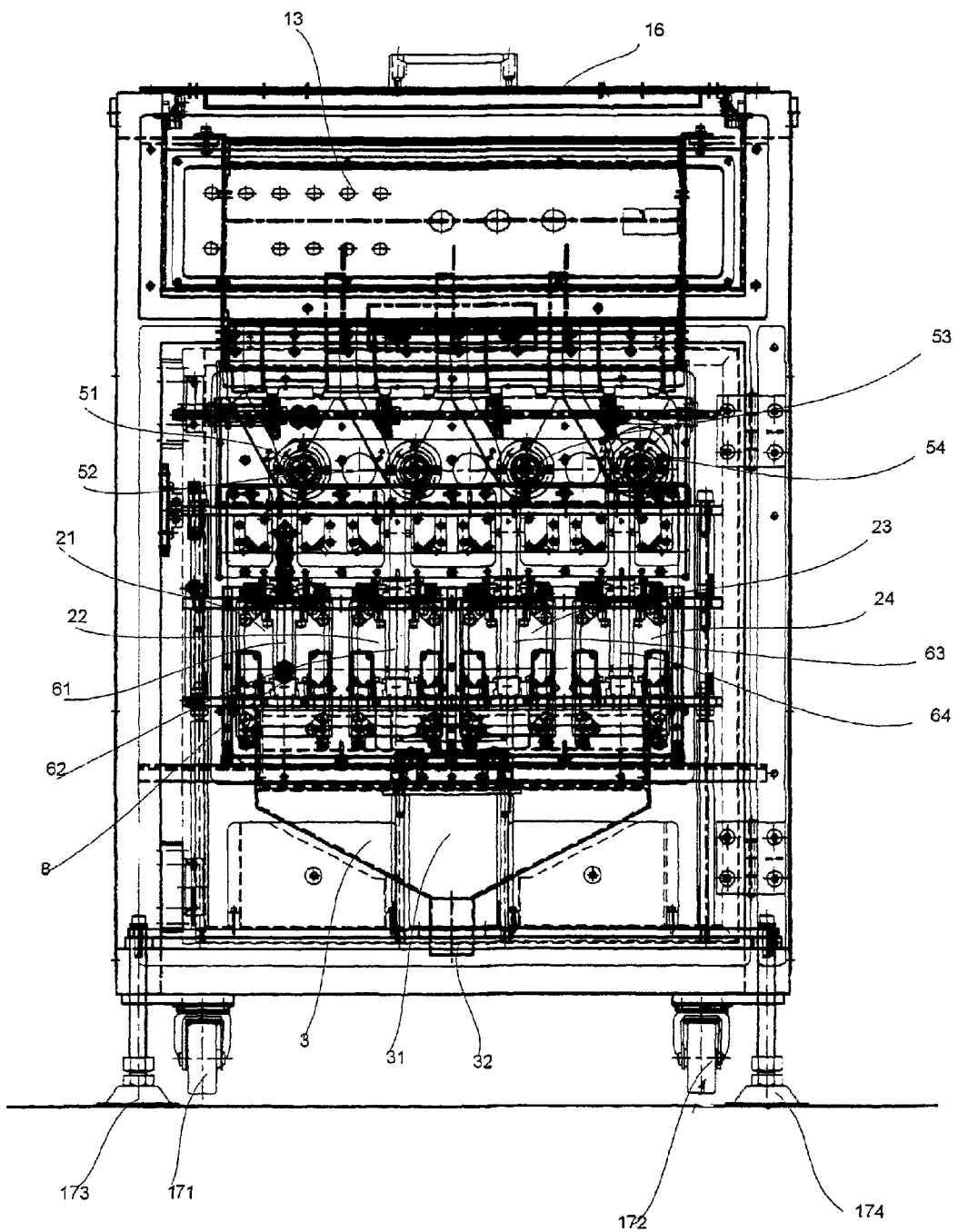
FIG. 3 A front view of a data writing apparatus according to an embodiment of the present invention, showing the state of the apparatus that a door thereof has been removed.
Figure 4:
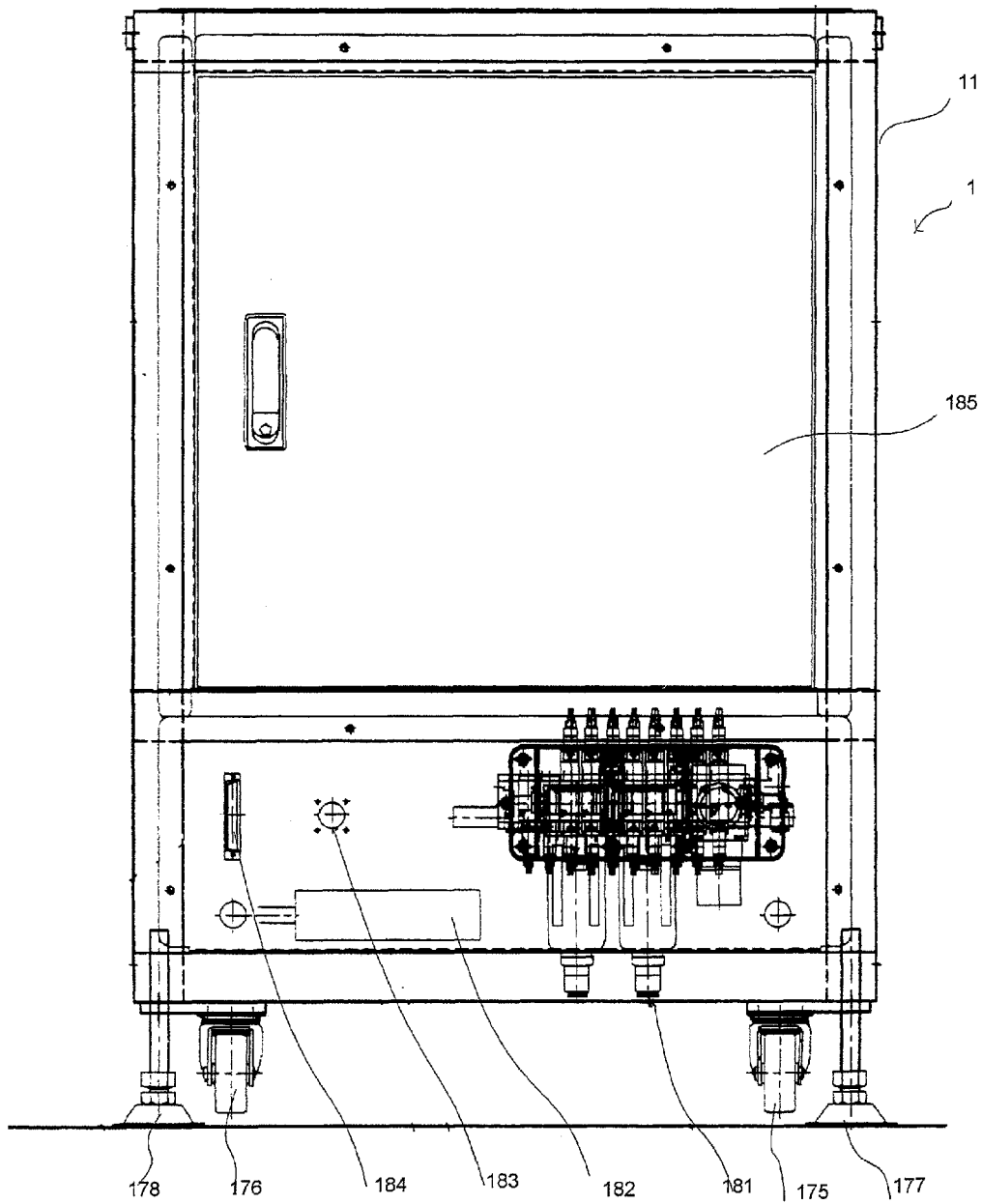
FIG. 4 A backside view of a data writing apparatus according to an embodiment of the present invention.
Figure 5:
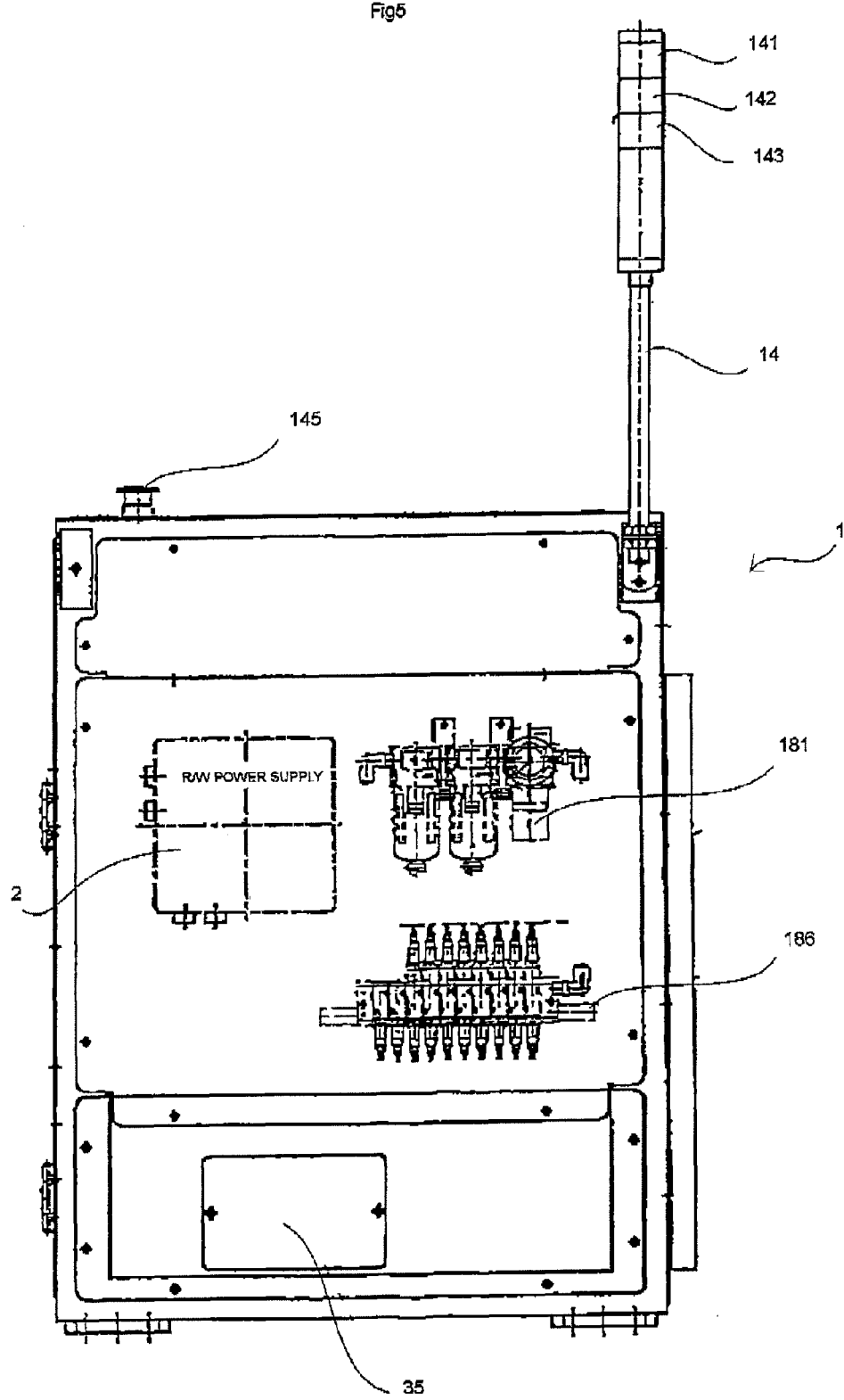
FIG. 5 A backside view of a data writing apparatus according to an embodiment of the present invention, showing the state of the apparatus that a relay panel thereof is removed.
Figure 6:
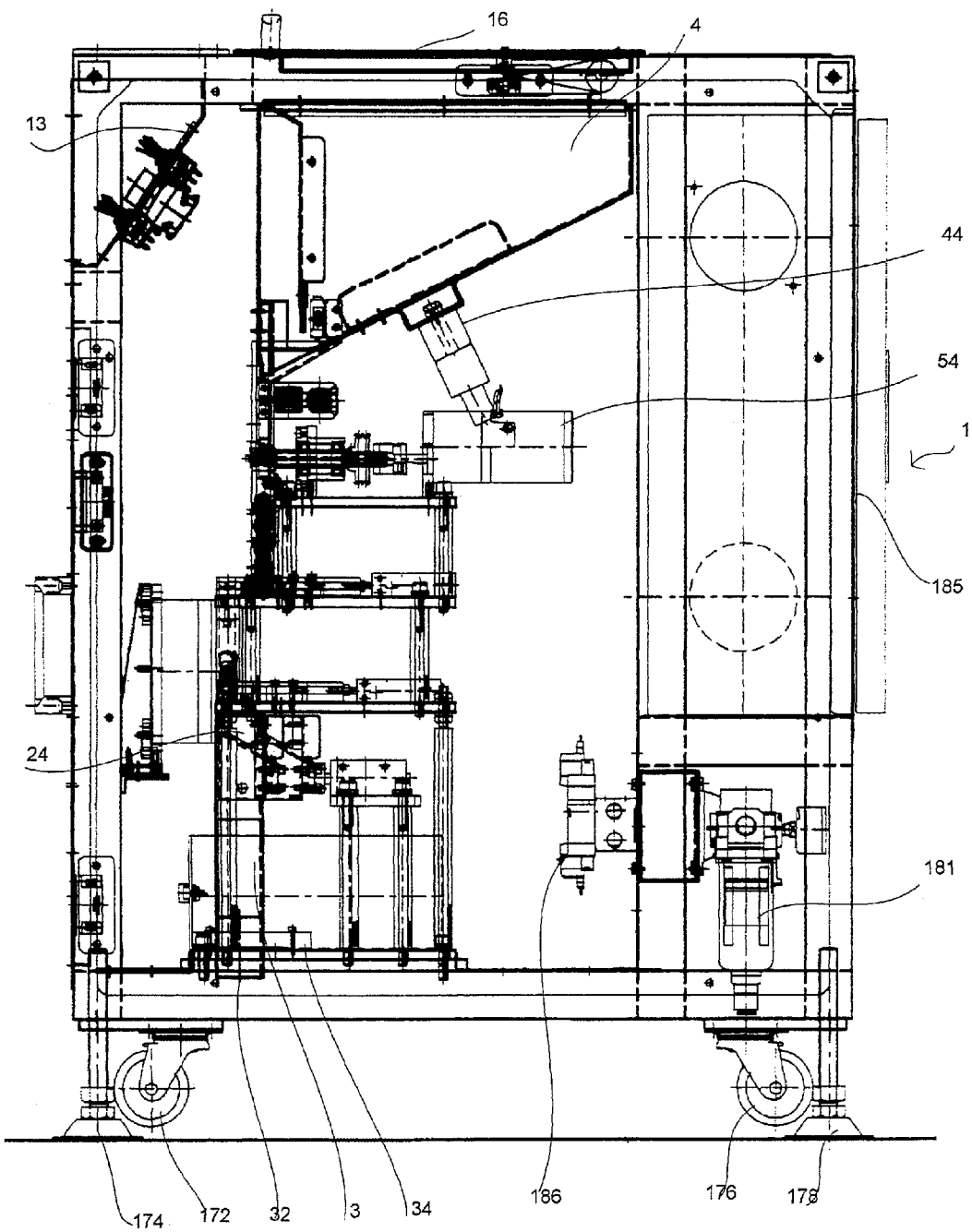
FIG. 6 A right-side view of a data writing apparatus according to an embodiment of the present invention, showing the state of the apparatus that a lateral board of the casing is removed.
Figure 7:
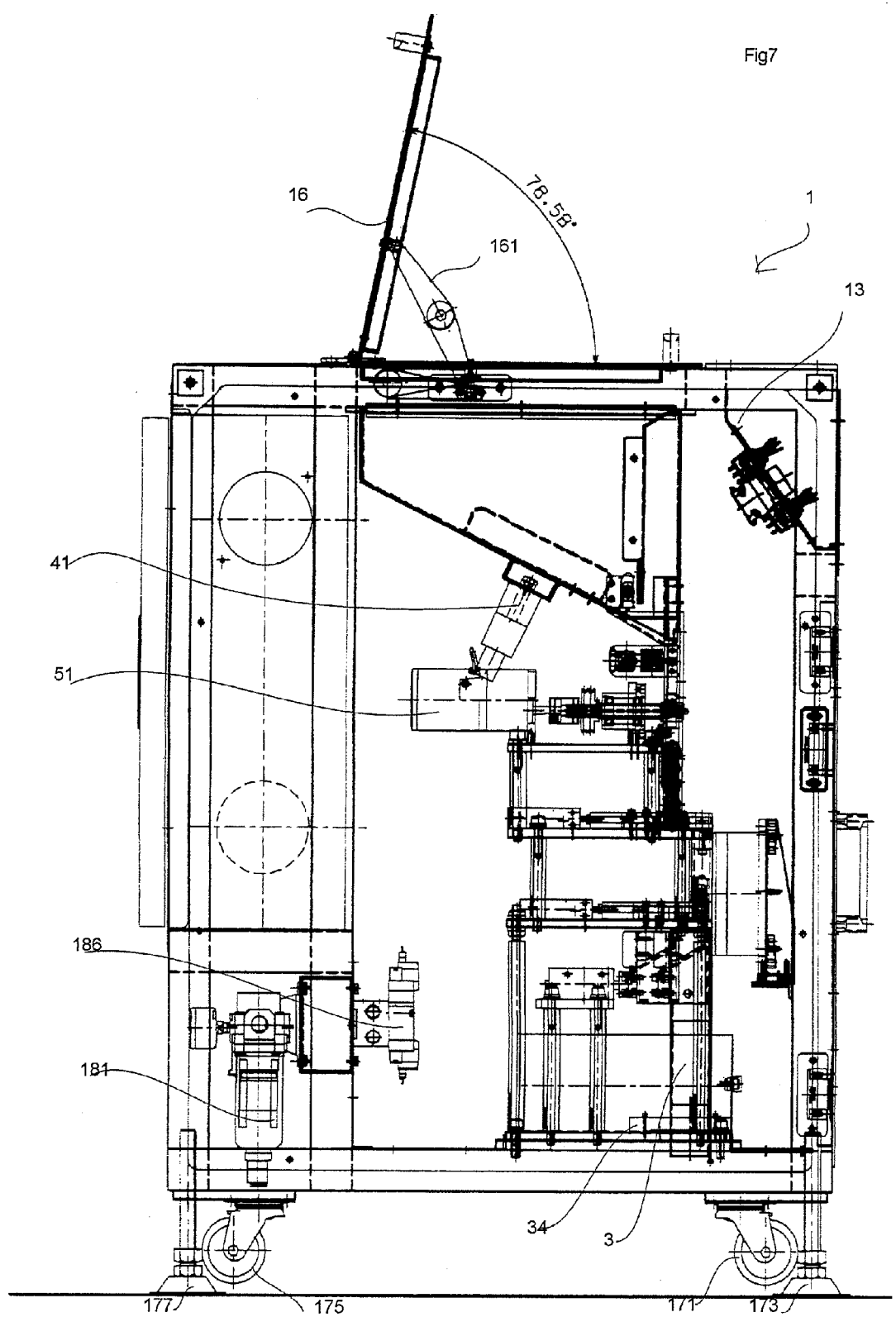
FIG. 7 A left-side view of a data writing apparatus according to an embodiment of the present invention, showing the state of the apparatus that a lateral board of the casing is removed.
Figure 8:
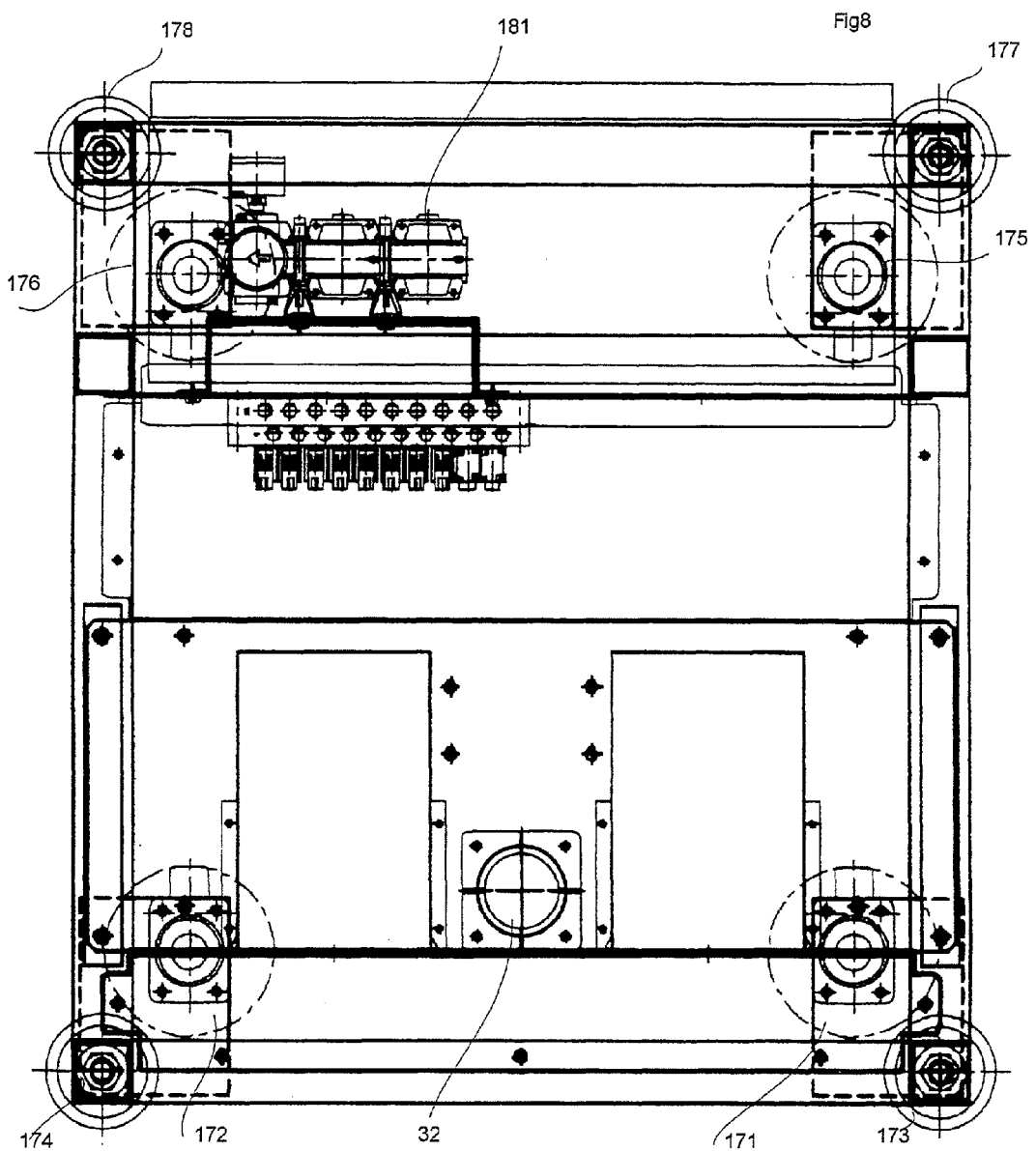
FIG. 8 A bottom view of a data writing apparatus according to an embodiment of the present invention.
Figure 9:
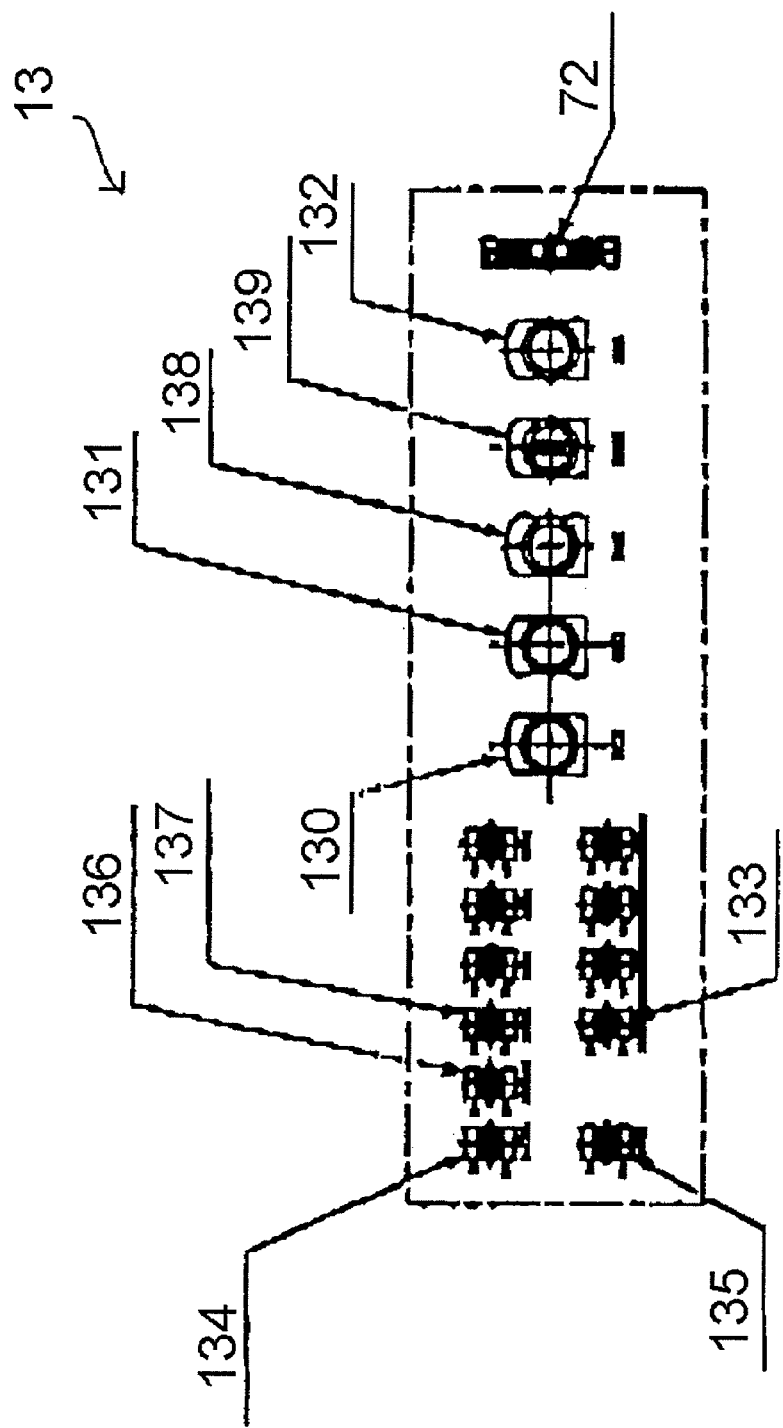
FIG. 9 A front view of an operation panel.
Figure 10:
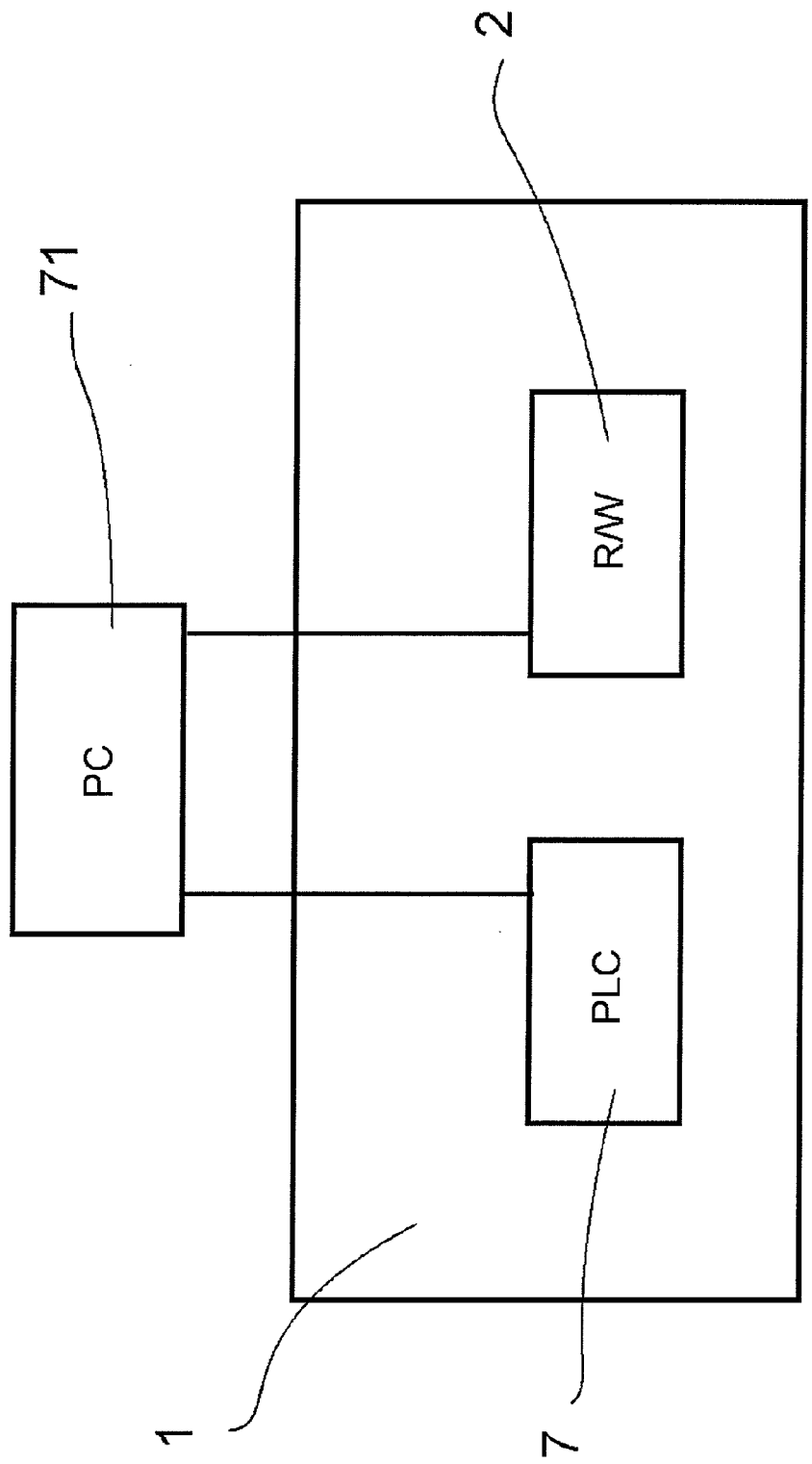
FIG. 10 A control block diagram for explaining a data writing apparatus according to the present invention.
Figure 11:
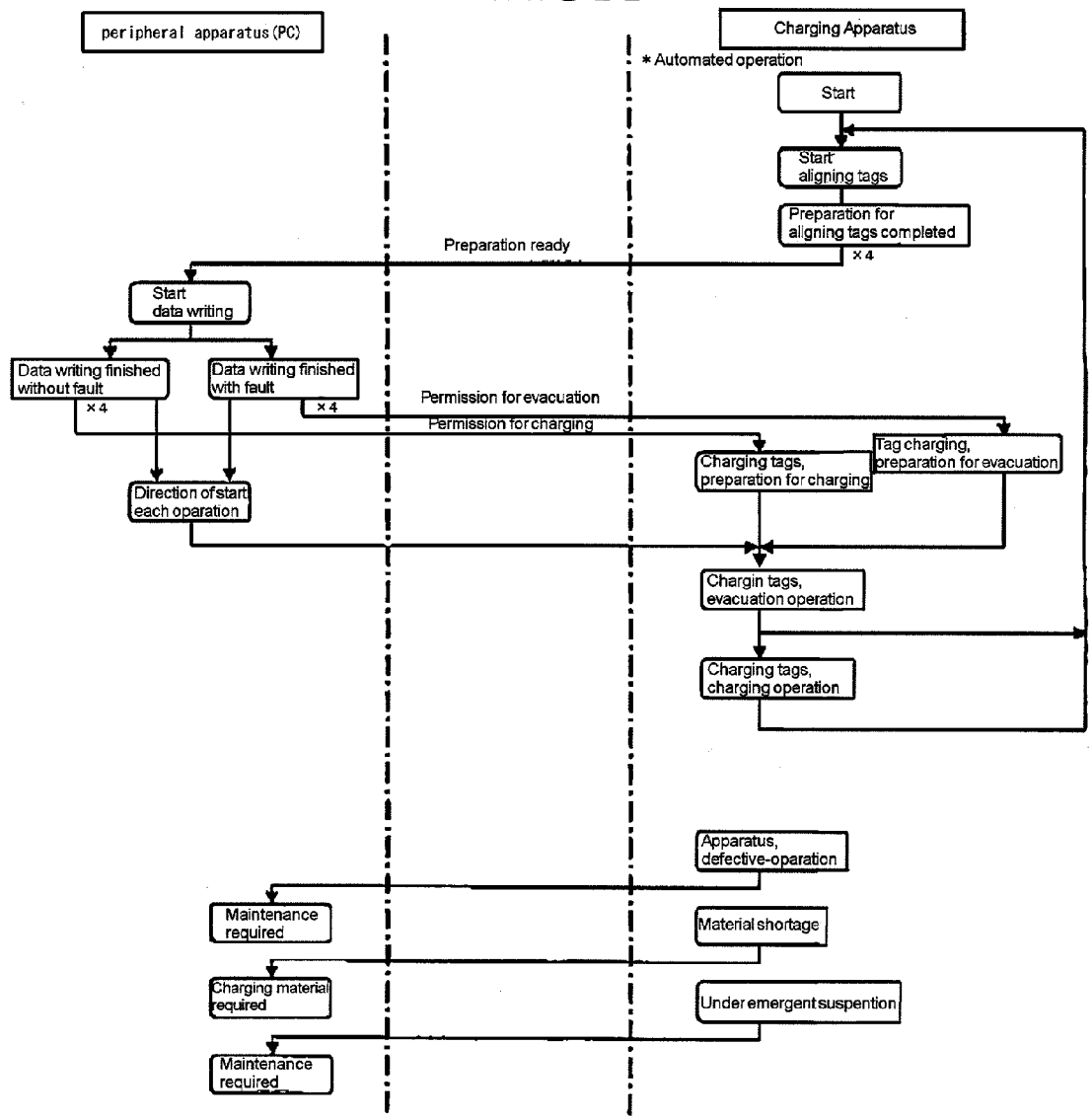
FIG. 11 A control flow chart.
Figure 12:
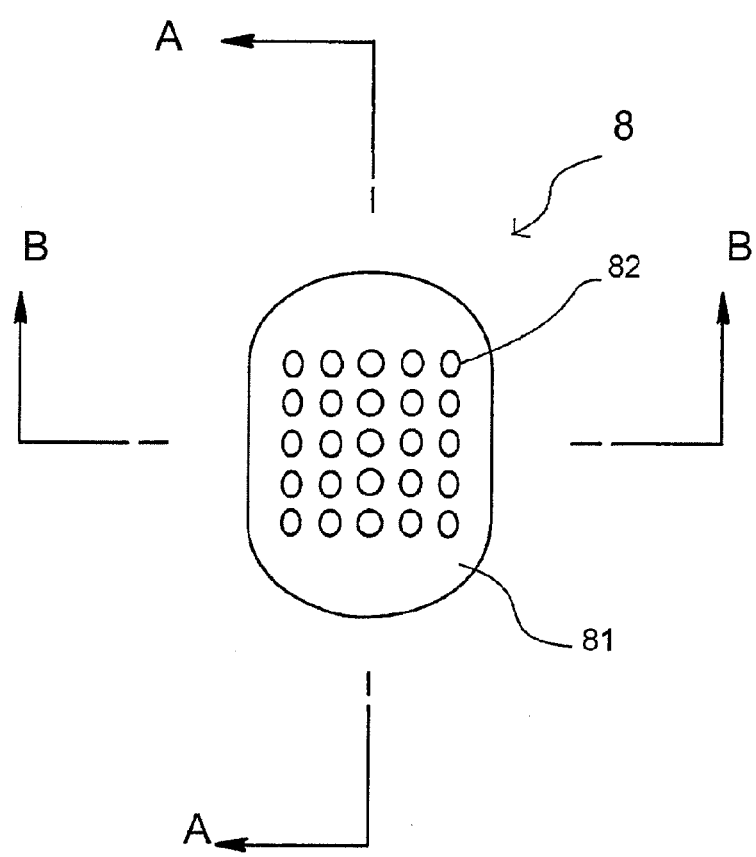
FIG. 12 A front view of a wireless IC tag to be used for a data writing apparatus according to the present invention.
Figure 13:
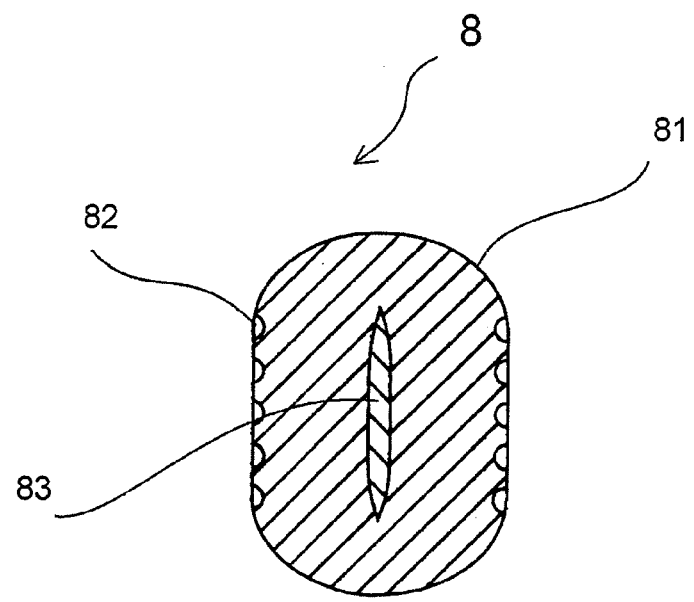
FIG. 13 A cross-sectional view taken along A-A line of a wireless IC tag to be used for a data writing apparatus according to the present invention.
Figure 14:
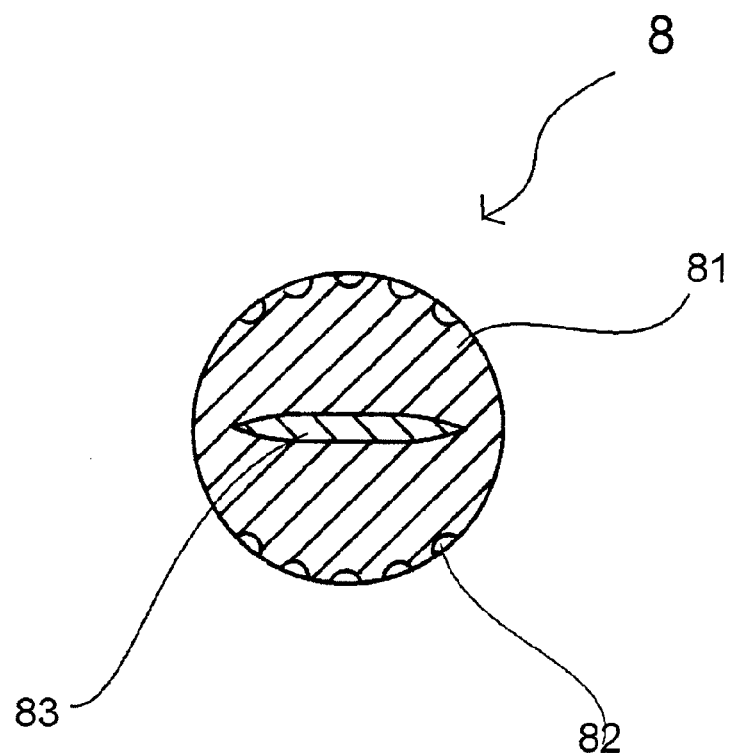
FIG. 14 A cross-sectional view taken along B-B line of a wireless IC tag to be used for a data writing apparatus according to the present invention.

FIG. 1 is a schematic perspective view of a data writing apparatus for writing data to a wireless IC tag, hereinafter designated as "data writing apparatus" according to the present invention. FIG. 2 is a front view of a data writing apparatus according to the present invention. FIG. 3 is a front view of the apparatus shown in FIG. 2, showing the state that the front door thereof is removed. FIG. 4 is a back side view of the data writing apparatus according to the present invention. FIG. 5 is aback side view of the apparatus shown in FIG. 4, showing the state that the relay panel door thereof is removed. FIG. 6 is a right side view of the apparatus according to the present invention, showing the state that the lateral plate of the casing thereof is removed. FIG. 7 is a left side view of the apparatus according to the present invention, showing that the lateral plate of the casing thereof is removed and the lid of the hopper section of the apparatus is opened. FIG. 8 is a bottom view of the apparatus according to the present invention. FIG. 9 is a front view of the operation panel of the apparatus. FIG. 10 is a block diagram of the control system of the apparatus according to the present invention. FIG. 11 is a control flow chart of the apparatus according to the present invention. FIG. 12 through FIG. 15 are front view of wireless IC tag to be used for the data writing apparatus according to the present invention, a cross-sectional view thereof taken along A-A line, a cross-sectional view thereof taken along B-B line, and a cross-sectional view of a wireless IC chip adapted to be used for the wireless IC tag, respectively.

The data writing apparatus according to the present invention includes a reader/writer having at least data writing performance as a radio communication means which writes data to wireless IC tags through radio communication, and a wireless IC tag charging member for embedding the wireless IC tags to the object to be embedded with wireless IC tags received in a mixing/kneading tank in any state of liquid, viscous or semisolid material. The radio communication means writes data to the wireless IC tags, and the wireless IC tags having been written with data are embedded into the object to be embedded with wireless IC tags through the wireless IC tag charging member.

Further, the data writing apparatus according to the present invention is provided with a passage for guiding the wireless IC tags to the radio communication means and the wireless IC tag charging member in this order, a sequence control unit for controlling the apparatus as the control means, and a computer for storing data. The radio communication means writes data through radio communication to the wireless IC tags which are guided into the data writing region in the vicinity of the radio communication means, and the wireless IC tag charging member is adapted to embed the wireless IC tags having been written with data into the object to be embedded.

In FIG. 1 through FIG. 9, an embodiment of the data writing apparatus according to the present invention is shown. In this embodiment, the data writing apparatus to be used for embedding the wireless IC tags 8 into the mixing/kneading tank 91, in which unhardened concrete 9 as the object to be embedded with wireless IC tags is received, is explained as an example. As described later, the object to be embedded is not limited to unhardened concrete, and any material which can be in liquid, viscous or semisolid state and to which wireless IC tags can be embedded may be used. For examples, uncured mortar, thermoplastic resins and gypsum are exemplified. In the data writing apparatus 1, four lines of reader/writers 2 are installed, and each line is adapted to perform the same operation, namely four pieces of wireless IC tags 8 are embedded at once through the wireless IC tag charging member 3. However, the line to be installed may be either one line or plural lines, and it is not limited to four lines.

The data writing apparatus 1 is arranged so that all of components of the apparatus are housed in the casing in view of easiness for transportation, prevention form dust invasion, etc. The charging pore 32 of the wireless IC tag charging member 3 is arranged so that it is positioned above the unhardened concrete 9 being received in the mixing/kneading tank 91. To the casing 11, a door 15 for maintaining the respective components and a relay panel 185 are provided. Note that the respective components are not necessarily housed in the casing 11.

The data writing apparatus 1 comprises a hopper section 4 arranged so as to position above the data writing apparatus, release sections 41-44 for releasing wireless IC tags 8 from the hopper section 4, a first passage 5 for guiding the wireless IC tags 8 released from the release sections 41-44 to second passages 61-64 by virtue of changing the air pressure in cylinders 51-54, second passages 61-64 for releasing a prefixed quantity of wireless IC tags having been written with data to the wireless IC tag charging member 3 arranged beneath the data writing apparatus 1, a wireless IC tag charging member 3, and reader/writers 21-24 arranged respectively in the vicinity of the second passage 61-64. The wireless IC tags 8 released from the hopper section 4 are guided to the release sections 41-44, cylinders 51-54, the second passages 61-64, and the wireless IC tag charging member 3 in this order. In the data writing regions of the second passages 61-64, the reader/writers 21-24 write data to the wireless IC tags. Then, the wireless IC tags are embedded to the concrete 9 received in the mixing/kneading tank 91 through the wireless IC tag charging member 3.

The hopper section 4 provided on the position above the data writing apparatus 1 is formed in a box-like shape capable of containing a plurality of wireless IC tags 8, and it is so configured that wireless IC tags before being written with data are received from the pore 12 for embedding wireless IC tags 8 provided in the ceiling part of the casing 11 to the housing section 45. The pore section 12 is covered with a lid 16, and the lid 16 is supported by a hinge 161 and is structured to be freely opened and closed. In addition, the wireless IC tag 8 is designed to be released to the first passage 5 via the release sections 41-44 being connected to the opening in the bottom of the housing section 45. In the data writing apparatus 1 according to this embodiment, the hopper section 4 is adapted to receive more than 200 pieces of wireless IC tags 8. Note that, without providing such hopper section 4, the wireless IC tags may be supplied from the outside.

The wireless IC tags 8 released from the hopper section 4 through the release sections 41-44 pass through the first passage 5 and are guided to the data writing regions in the vicinity of the reader/writers 21-24 via the second passages 61-64. In the first passage 5, cylinders 51-54 are arranged, and it is configured that the interior of each cylinder 51-54 is made in negative pressure condition by virtue of air pressure adjustment of the air regulator 181 connected to an air valve 186 to thereby draw in the wireless IC tags 8 to the cylinders 51-54, and that the wireless IC tags 8 are delivered to the second passages 61-64 by virtue of causing the interior of the cylinders 51-54 in atmospheric pressure or compressed condition. The operation of the air regulator 181 may be controlled independently, or may be connected with the sequence control unit 7 to thereby operate it depending on the control of the sequence control unit 7. Note that the guiding means for the wireless IC tags 8 is not limited to the means to transfer wireless IC tags by utilizing the change in air pressure between the cylinders 51-54 and the air regulator 181, and a conveyer, or the means which can cause wireless IC tags to roll and slide in the passage by virtue of its own weight may be used.

The reader/writers 21-24 are arranged in the vicinity of the second passages 61-64, respectively, or in the position where data writing through radio communication can be securely done, which is in the range up to approximately 10 mm separate from the second passages 61-64 in this embodiment, respectively, and the reader/writers 21-24 exert at least data writing performance to the wireless IC tags 8. When the sensors 65-68, those which are arranged to the second passages 61-64, respectively, detect the arrival of the wireless IC tags 8 to the data writing region in the vicinity of the reader/writers 21-24, the sequence control unit 7 having received signals from the sensors 65-68 outputs signals to the reader/writers 21-24 through the reader/writer control section 2 for controlling the reader/writers, and the reader/writers 21-24 write the data being stored in the computer 71 to the wireless IC tags 8 through radio communication.

In this embodiment, the reader/writers 21-24 are provided with, other than data writing performance, data reading performance, and are adapted to read data and to detect data writing errors. Further, the reader/writers 21-24 output radio waves falling within the communication frequency band which is used for the wireless IC tags 8 to be embedded. Note that the frequency band used for the radio waves may be established so that it can be switched in accordance with the communication frequency band to be used for the wireless IC tags 8. It should be noted that the data reading performance is not always required for the reader/writers, since it is enough if they have at least data writing performance.

Further, the sensors 65-68 are respectively constituted with a pair of photointerrupters consisting of infrared LED and charge-coupled devices for detecting light from infrared LED to thereby detect the passing of wireless IC tags 8, and in this embodiment, the sensors are adapted to achieve its function as a counter for counting the number of passing wireless IC tags 8. Note that the sensors are not limited to a photointerrupter, and any sensors capable of detecting the passing of the wireless IC tags based on the change in the capacitance may be used. Further, beside the sensors 65-68, a rotary counter that feeds a prefixed number of wireless IC tags on every rotation to the passage may be arranged.

In an embodiment of the present invention, measuring apparatuses for determining the ratio of cement to be mixed in the unhardened concrete 9 to be embedded and the property such as temperature are connected to a computer 71 to which a database for the unhardened concrete information is installed, and information on the unhardened concrete is stored in the database in the computer 71. And the other relevant information to be stored upon requirement, such as shipping dates and shipping destinations are also stored in the database in the computer 71. The reader/writers 21-24 are adapted to access this database to write the data to the wireless IC tags 8.

In each of the data writing regions of the second passages 61-64, a shutter (not shown) as an opening/closing means is arranged. It is configured that the wireless IC tags 8 are forced to stay on the closed shutter temporarily so that data can be written to them, and then, after the shutter has been opened, the wireless IC tags 8 having been written with data are released to the wireless IC tag charging member 3. Note that the wireless IC tags are not necessarily forced to stay in the data writing region, and data writing to the moving wireless IC tags is also feasible. And, the means to force the wireless IC tags 8 to stay in the data writing region is not limited to the shutter, and any means which can hold the tags by means of air emission or by other holding structure such as an arm may be used.

Further, when occurrence of data writing error in the wireless IC tag is detected by the reading performance of the reader/writers 21-24, the evacuation outlet of the evacuation section 34 is opened so that the wireless IC tags with data writing error are evacuated from the second passages 61-64 to the evacuation section 34. Besides, it is so structured that the wireless IC tags 8 with data writing error may be removed through the outlet 35. Further, a means for detecting an occurrence of data writing error in the wireless IC tag may be provided separately from the reader/writers 21-24.

The wireless IC tag charging member 3 has a structure adapted to receive the wireless IC tags released from the second passages 61-64 to thereby embed them into the mixing/kneading tank in which unhardened concrete 9 is received through the charging pore 32. Specifically, the wireless IC tag charging member 3 comprises a tag reception server 31 for receiving wireless IC tags, which is arranged under the release outlets of the second passages 61-64, and a charging pore 32 being opened in the bottom of the tag reception server 31, and the wireless IC tags 8 fall into the mixing/kneading tank 9 by virtue of their own weight through the charging pore 32. Here, it is preferable that the tag reception server has a shape of which part extending toward the charging pore 32 is tapered.

Preferably, an air interruption means for preventing occurrence of reverse pressure from the outside is provided to the charging pore 32. Alternatively, an opening/closing means such as air curtain and a shutter may be installed. Further, for accelerating the embedding of the wireless IC tags, air ejection may be used to accelerate dropping of the wireless IC tags to a mixing/kneading tank 91. Note that the charging pore 32 is not necessarily provided to the bottom of the data writing apparatus as shown in FIG. 1, and the charging pore 32 may be structured such that the wireless IC tags 8 are embedded from the lateral side of the data writing apparatus 1.

It is configured that, in the bottom section of the data writing apparatus 1, casters 171, 172, 175 and 176 for horizontally adjusting the position of the data writing apparatus 1 so that the charging pore 32 of the wireless IC tag charging member 31 is positioned in place and adjusters 173, 174, 177 and 178 are arranged to thereby allow the data writing apparatus 1 to move in horizontal direction and the charging pore 32 to freely move in vertical direction for fixing the position.

As shown in FIG. 9, in the data writing apparatus 1, an operation panel 13 for performing the controlled operation of the data writing apparatus 1 is arranged. This operation panel 13 engages with the sequence control unit 7, and a start switch 130 for starting the data writing apparatus 1, a stop switch 131 for stopping the data writing apparatus 1, a reset switch 132 for cancelling the emergent suspension, a shutter switch 133 for activating shutters arranged in the second passages 61-64, a hopper switch 134 for releasing wireless IC tags from the hopper section 4, a motor switch 135 for activating a motor, an evacuation shutter switch 136 for activating selection of wireless IC tags with data writing error, a cylinder switch 137 for activating the cylinders 51-54, an origin restoring switch 138 for restoring each components to the origin, an automated/manual operation commuting switch, and computer connecting section 7 of the computer 71 and the sequence control unit 7 are provided to the operation panel. Note that the data writing apparatus according to the present invention is so configured that, once pushing the start switch 130, the operation to release the wireless IC tags from the hopper section 4 to the release sections 41-44, the operation of the cylinders 51-54 in the first passage 5, the operation of the shutter in the second passages 61-64, and data writing operation by the reader/writers 21-24 are carried out without activating the other operation switches, and the wireless IC tags are guided to the wireless IC tag charging member 3.

An emergent suspension switch 145 for emergently stopping all components of the data writing apparatus 1 may be arranged to the data writing apparatus 1. Furthermore, a signal tower 14 which engages with the sequence control unit 7 may be arranged in the data writing apparatus 1. The signal tower 14 comprises a pole 144 and a green lamp 141, a yellow lamp 142 and a red lamp 143, those which are attached to the pole 144. For example, it is configured to indicate the operating state of the data writing apparatus 1 by setting the green lamp to lighten during the automated operation, the yellow lamp to lighten when supply of the wireless IC tags is required, or the red lamp to lighten during malfunction of the apparatus has been occurring.

The data writing apparatus 1 is configured so that it is activated with electricity supplied from the outer power source through the power supply section 182. The other components, such as connectors 183, 184, an AC/DC converter (not shown) and a cutout, are mounted to the data writing apparatus 1 in order to actuate the respective components.

In this embodiment, unhardened concrete 9 received in the mixing/kneading tank 91 is liquid material prepared by kneading aggregate, cement, water, etc., and the mixing/kneading tank 91 is installed on a place one floor down the place where the data writing apparatus 1 is set. The mixing/kneading tank is so configured that it receives wireless IC tags 8, which are embedded from the data writing apparatus 1 locating above the tank to the wireless IC tag charging member 3, through the charging inlet 92 of the mixing/kneading tank 91. The unhardened concrete 9 kneaded with wireless IC tags is loaded on a vehicle equipped with a concrete mixer and is shipped to the casting site. In the casting site, unhardened concrete containing wireless IC tags is casted, and the concrete is then hardened to make a concrete structure. Then, by directing the reader/writers toward the concrete structure and followed by operating radio communication, information on the unhardened concrete recorded in the wireless IC tags can be read, and further, new information can also be written into the wireless IC tags.

As shown in the block diagram of FIG. 10, a controlled operation program is installed in advance to a computer provided to the sequence control unit 7. The sequence control unit 7 is electrically connected to the reader/writer control section 2, which integrates and controls at least reader/writers 21-24, and is adapted to control data writing through radio communication from the reader/writers 21-24. Further, in this embodiment, the sequence control unit 7 is configured to control an operation of the opening/closing member in the release section of the hopper section 4, an operation of air regulator 181 for activating cylinders 51-54 arranged to the first passage 5, opening/closing operation of shutters at the second passages 61-64, an operation to evacuate wireless IC tags with data writing error, and an operation of the reverse pressure interception means at the charging inlet. Note that the sequence control unit 7 may be arranged to either the interior or the exterior of the casing 11 in the data writing apparatus 1.

Now, the control flow of the sequence control unit 7 will be explained with reference to the flow chart shown in FIG. 11. The start switch 130 is pushed, then the data writing apparatus 1 starts the automated operation. The sequence control unit 7 then starts the control to align the wireless IC tags and actuates the cylinders 51-54 to align the wireless IC tags 8 being in the second passages 61-64 in the data writing region. When the sensors 65-68 detected this alignment, the sequence control unit 7, that has received signals from the sensors, outputs those signals to the reader/writer control section 2. In response to the signal outputted from the sequence control unit 7, the reader/writers 21-24 write data being stored in the database operated by the computer 71 to the wireless IC tags 8 through radio communication. When it is detected by virtue of the reading performance of the reader/writers 21-24 that data has been written correctly, the sequence control unit 7 is adapted to output a signal for permitting embedding of wireless IC tags, then opens the shutters, and further executes feeding and embedding of wireless IC tags 8 to wireless IC charging member 3. On the other hand, when any defective in the data writing into wireless IC tags had been detected, the sequence control unit 7 outputs a signal for permitting evacuation. As a consequence, the second passages 61-64 executes evacuation operation so that the wireless IC tags 8 are evacuated to the evacuation section 34, and the passages communicating with the evacuation section 34 are opened.

When any defective in the apparatus is detected, a red lamp 143 of signal tower 14 lightens to notice that the maintenance is required. Besides, when it has been detected that wireless IC tags 8 in the hopper section 4 get short and are not released from the hopper section 4, a yellow lamp 142 of the signal tower 14 lightens to notice that the due embedding is required. Further, during the emergent suspension of the operation, a red lamp 143 of the signal tower 14 lightens to notice that the maintenance is required. Note that during the normal operation of all components, a green lamp 141 is lightening.

Now, the structure of the wireless IC tags 8 used for the data writing apparatus 1 will be explained with reference to FIGS. 12 through 15.

Figure 15:
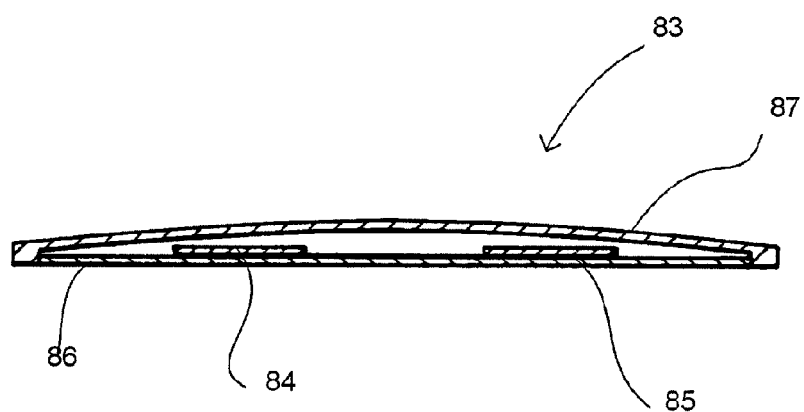
FIG. 15 A cross-sectional view of a wireless IC chip of a wireless IC tag to be used for a data writing apparatus according to the present invention.

The wireless IC tag chip 83 comprising the wireless IC tag 8 is a memory capable of writing and reading data, which is also called as RFID tag. As shown in FIG. 15, FeRAM chip 84 called as ferroelectric memory using a ferroelectric as a memory element for IC tag is mounted on a substrate 86 made of a metal plate, a ceramic plate or the like, and is coated with a cover 87.

Any type of the FeRAM can be used for constituting a FeRAM chip 84 of wireless IC tag 8, and any of the capacitor type and the transistor type can be used. Note that the FeRAM that can be used for the control system for the products and the like is the passive-type FeRAM that does not mount an electric source and commutes electric waves for accessing data from the outside to use as the electric source. This FeRAM chip 84 is mounted with FeRAM that is a non-volatile memory using a ferroelectric, a electric source section that, instead of including batteries for driving, receives signals from the outside and resonates with the signals to generate current, and an antenna section prepared like a film for performing radio communication.

Comparing to the rewritable times of EEPROM that has been used for the conventional wireless IC tag, which is more or less $10^5$ times, FeRAM constituting the FeRAM chip 84 has excellent performance with regard to the rewritable times of more than $10^{13}$ times. Contrary to the writing voltage of the conventional EEPROM which is 12V, FeRAM can write with extremely low voltage of DC 1.1V to 3V. Therefore, even a passive type FeRAM having an electric source section that resonates with electric waves from the outside to generate electricity can sufficiently work without having a battery inside thereof, and it has writing speed 5,000 times faster than conventional EEPROM having been used for IC tags. The conservation period for data is longer than 10 years. Further, as to access for rewriting, contrary to the rewriting by means of the conventional EEPROM and a flush memory was carried out on every block unit, there is an advantage for FeRAM that rewriting with FeRAM can be done at random on a word basis.

The control means may be configured such that it can be written additionally, but cannot be given with superscription in order to prevent interpolation of ever-written information, and writing and reading of data are preferably carried out by using an encoded protocol. Therefore, various data can be written into a memory with a capacity of approximately 8 KB through radio communication between reader/writers 21-24 as a writing/reading apparatus on every occasion as shown in FIG. 4.

The frequency bandwidth with which FeRAM can perform radio communication may be fixed freely. Although FeRAM can use a frequency band in the range of from LF band to UHF band, however, since the antenna section can perform steady communication using ground waves, has strong directivity, and is resistant to the influence of water, dust and metals, and therefore, the frequency bandwidth is preferably set to LF band (long wave band) communication capable of performing high liability data communication. Note that the frequency bandwidth may also be set to that for a frequency band communication, such as VHF band, HF band, and MF band.

The data reading apparatus of the present invention is so configured that it can distinguish if the wireless IC tag is the one that may constitute a desired control system or not, wherein a control flag readable with various reader/writers is stored in the FeRAM chip 84 of wireless IC tag 8 either in advance or at the time of data writing, and writing and reading of information is executed by the reader/writers by means of reading the control flag. Note that, if required, an anti-collision performance may be mounted to the wireless IC tag so that communication jam due to the positioning in close distance of a plurality of wireless IC tags is prevented from occurring.

Note that, though it is not always necessary, a UHF band communication antenna chip 85 being adapted to UHF band (super-ultra short communication band) communication having a broad communication area, of which communication distance for reading and writing data by means of the reader/writer 2 is as many as several meters, may be mounted for executing the control of moving objects and the control in a broad area, as shown in FIG. 15. It is enough for the UHF band communication antenna chip 85 if it has performance as a UHF band communication antenna only. However, mounting a conventional UHF memory chip with less capacity onto the wireless IC tag and use the UHF memory chip as a UHF band communication antenna, the wireless IC tag 8 may be used as a hybrid type wireless IC tag 8.

The wireless IC tag 8 is molded in a polygonal, spherical, elliptic or bale-shaped form, which is capable of rolling and moving smoothly to pass through the passages.

Further, it is preferable for the wireless IC tag 8 to be embedded into unhardened concrete 9 to satisfy the following conditions. The size of the wireless IC tag 8 is desirably as same as the size of an aggregate, and in this embodiment, the wireless IC tag is formed into an elliptic (bale-shaped) piece with a dimension of 17 mm in the longitudinal direction and 12 mm in the lateral direction, in order to improve the affinity with the unhardened concrete and to prevent the wireless IC tag from sinking.

The specific gravity of wireless IC tag 8 to be embedded into unhardened concrete is preferably in the range of 1.3 to 1.9, which is close to the specific gravity of an aggregate, and the wireless IC tag is prepared so that its specific gravity becomes 1.5 in this embodiment. In the dispersion test for wireless IC tags 8 in the unhardened concrete, the wireless IC tags 8 float inside the unhardened concrete and there is a fear that they might be exposed on the surface of the unhardened concrete when they are prepared to the one with a specific gravity of 1.3 or less. On the other hand, the wireless IC tags may sink or may be distributed unevenly in the unhardened concrete without being evenly dispersed into the unhardened concrete, when they are prepared to the ones with a specific gravity of 1.9 or higher. It has been confirmed that the wireless IC tags prepared so as to have a specific gravity of 1.5 more or less can be most evenly dispersed in the vicinity of the surface of the unhardened concrete. Specifically, when a plurality of wireless IC tags with a specific gravity of 1.5 are embedded into 1 cubic meter of unhardened concrete during the unhardened concrete manufacturing process where aggregate, cement, water, etc. are mixed and kneaded, the wireless IC tags are distributed at a position being 9.3 cm in average inward from the surface of the unhardened concrete, and the standard deviation of 3.826, the mean distance value of 8.00, the minimum distance value of 4.17 and the maximum distance value of 11.83 are obtained. Therefore, reading and writing data is made surely feasible even for the wireless IC tags, of which distance for carrying out reading and writing through radio communication is 10 cm more or less.

The wireless IC tags 8 as described above are formed by covering them with wireless IC tag chip covertures 81. The surfaces of the covertures 81 are processed to make concave points 82 thereon. Since the concave points 82 made on the surfaces of the covertures 81 are further dimple processed, unhardened concrete intrudes into the concave points to give cohesion property and affinity between the wireless IC tags and unhardened concrete. Further, the strength of the wireless IC tags 8 can be increased by forming those concave points 82. In this embodiment, the dimple processing was executed during the injection molding to form 25 dimpled points on each side of the wireless IC tag, namely 50 dimpled parts in total. However, such dimple processing may be executed to the whole surface or to the partial surface of wireless IC tag. Then, though the depth of a concave point is in the range of 0.2 to 0.5 mm in this embodiment, the depth will not be limited to that range. The processing of the concave points 82 is not limited to the dimple processing, and concave holes may be formed on the surface of the covertures 81, or the covertures 81 may be curved, or the coverture 81 may be formed in a concave shape and provided with concave points thereon. Note that, as a matter of course, forming such concave points is not necessarily required, and the surface of the wireless IC tag may be formed in a smooth plane.

The coverture 81 is consisting of a thermoplastic resin and covers the wireless IC tag so that the wireless IC tag positions in the center thereof. Specifically, as the coverture 81, an alkali-resistant resin material, which can resist to strong alkali of pH ranging from 12.0 to 13.0, that is caused by cement, and to a high temperature up to 100° C., that is caused by mixing and kneading of aggregate, water and cement. In an embodiment according to the present invention, when polyamide-based resin, particularly polyamide MXD6 composite resin is used as the material for the coverture 81, it was confirmed that the coverture can show excellent mechanical strength and elastic module over a wide range of temperature, less change in the dimension due to water absorption when mixed/kneaded with aggregate, water, cement, etc. and less deterioration in the mechanical strength.

Note that the reny material (produced by Mitsubishi Engineering Plastic Co., Ltd.), which is prepared by reinforcing polyamide MXD6 with non-permeable glass fibers, inorganic fillers or the like is used for the coverture 81, and the bodies of wireless IC tags are covered with the coverture 81, and then subjected to injection molding. In this case, it has been confirmed that, in terms of strength, the wireless IC tag can resist to a load of 197 kgf in average imposed from the longitudinal direction and to a load of at least 148 kgf in average imposed from the lateral direction. Further, in the tag expansion test according to the accelerated alkaline aggregate reaction method, when embedding wireless IC tags 8 during the manufacturing process of unhardened concrete where mixing and kneading aggregate, water, cement and the like is carried out, it was shown that the average expansion ratio is 0.49%, which is an expansion ratio giving no influence to the hardened concrete. Although the material contains non-permeable glass fibers, it gives no influence on radio communication because it contains no magnetic substance, such as ferrite. Note that, as the thermoplastic resins other than polyamide-based resins to be used for the coverture 81, urethane resins, vinyl chloride resins, styrene resins, olefinic resins, and polyester resins may be used.

The data writing apparatus 1 according to the present invention can be used, even the object to be embedded with wireless IC tags and received in the mixing/kneading tank is a material other than unhardened concrete. The object to be embedded may be, for examples, a thermoplastic resin in the fused state, and unhardened gypsum. And, any other materials may be use as the object to be embedded, as far as it can be in liquid, viscous or semisolid state.

The data writing apparatus of the present invention includes a radio communication means for writing data to wireless IC tags through radio communication and a wireless IC tag charging member for embedding the wireless IC tags having been written with data to the object to be embedded with wireless IC tags, those which are received in a mixing/kneading tank in the liquid, viscous or semisolid state, the radio communication means writes data to the wireless IC tags, and the wireless IC tags having been written with data are embedded into the object to be embedded with wireless IC tags through the wireless IC tag charging member. Thus, the data writing apparatus can firmly perform a series of processes, namely, writing data on product information, etc. to wireless IC tags and embedding the wireless IC tags to the product, without requiring any other auxiliaries. And, product management for the object to be embedded with wireless IC tags having been written with data can be achieved by using the reader/writers easily and firmly, by embedding the wireless IC tags having been written with product data to the product itself, namely the object to be embedded with wireless IC tags having been written with the product data.

What is claimed is:

1. A data writing apparatus for writing data to wireless IC tags comprising:
   a radio communication means for writing data to wireless IC tags through radio communication; and
   a wireless IC tag charging member for embedding the wireless IC tags having been written with data to an object to be embedded with wireless IC tags, which is in liquid, viscous or semisolid state;
   a passage for guiding wireless IC tags to a data writing region in the radio communication means and the wireless IC tag charging member in this order; and
   a counter mounted to the passage to thereby count the number of the wireless IC tags having had passed through the passage,
   wherein the radio communication means writes data to the wireless IC tags, and the wireless IC tags having been written with data are embedded to the object to be embedded with wireless IC tags by the wireless IC tag charging member.

2. The data writing apparatus for writing data to wireless IC tags according to claim 1,
   wherein the object to be embedded with wireless IC tags is unhardened concrete prepared by mixing/kneading cement, water, and aggregate and received in a mixing/kneading tank.

3. The data writing apparatus for writing data to wireless IC tags according to claim 1, further comprising
   a hopper section for receiving wireless IC tags, and
   wherein the wireless IC tags received in the hopper section are released from the hopper section to the passage.

4. The data writing apparatus for writing data to wireless IC tags according to claim 1, further comprising
   a cylinder having a given diameter, through which the wireless IC tags can pass, arranged in the passage that guides wireless IC tags toward the data writing region in the radio communication means, and a prefixed quantity of the wireless IC tags is delivered to the data writing region on every occasion by changing the air pressure inside the cylinder by means of an air control means.

5. The data writing apparatus for writing data to wireless IC tags according to claim 1, further comprising
   a passage opening/closing member arranged in the passage that guides wireless IC tags to wireless IC tag charging member, and
   wherein the wireless IC tags are forced to stop in the data writing region in the radio communication means by virtue of closing the passage opening/closing member and are written with data, and
   the wireless IC tags having been written with data are released to the wireless IC tag charging member by virtue of opening the passage opening/closing member.

6. The data writing apparatus for writing data to wireless IC tags according to claim 1,
   wherein the wireless IC tag charging member is arranged beneath the data writing apparatus and comprises a reception server for receiving the wireless IC tags having been written with data, those which are released from the passage, and the wireless IC tags having been written with data are embedded to the object to be embedded with wireless IC tags locating at a lower level than the wireless IC tag charging pore by virtue of falling due to their own weight.

7. The data writing apparatus for writing data to wireless IC tags according to claim 1, further comprising
   an air interrupter for preventing reverse wind from entering to a wireless IC tag charging pore.

8. The data writing apparatus for writing data to wireless IC tags according to claim 1,
   wherein the radio communication means is electrically connected with a database and a control means with wires or a wireless manner, the control means outputs signals to the radio communication means when the arrival of the wireless IC tags to the data writing region is detected by a detection means, and the radio communication means is a non-contact type radio communication unit that receives signals from the control means to output radio waves being in a range of a predetermined frequency band to antenna sections of the wireless IC tags through radio communication, thereby writing product information data stored in the database to the wireless IC tags.

9. The data writing apparatus for writing data to wireless IC tags according to claim 1,
   wherein the radio communication means is electrically connected with a database, in which unhardened concrete information transmitted from a measuring apparatus for determining the property of unhardened concrete is stored, and the control means through wired or radio communication, the control unit outputs signals to the radio communication means when the arrival of the wireless IC tags to the data writing region is detected by a detection means, and the radio communication means is a non-contact type radio communication unit that receives signals from the radio communication means to output radio waves being in a range of a predetermined frequency band to antenna sections of the wireless IC tags through radio communication, thereby writing the unhardened concrete information data stored in the database to the wireless IC tags.

10. The data writing apparatus for writing data to wireless IC tags according to claim 1, further comprising
    a data writing error detection means for detecting if data has been written correctly to wireless IC tags or not, and a selection means for selecting wireless IC tags with data writing error arranged in the passage downstream of the data writing error detection means, and
    wherein upon detection of data writing error to a wireless IC tag by the error detection means, the wireless IC tag with data writing error is evacuated to an evacuation section by the selection means.

11. The data writing apparatus for writing data to wireless IC tags according to claim 1,
    wherein the counter is a rotary counter which feeds a prefixed number of wireless IC tags on every occasion to the passage, or a photointerrupter which detects the passing of the wireless IC tags.

12. The data writing apparatus for writing data to wireless IC tags according to claim 1, further comprising
    a caster for adjusting a position of a charging pore of wireless IC tag charging member in a horizontal direction or an adjuster for adjusting the position of the position of the charging pore in a vertical direction is arranged in a bottom section of the data writing apparatus.

13. The data writing apparatus for writing data to wireless IC tags according to claim 1, further comprising
a sequence control unit used as the control means, and
wherein operations of the radio communication means, a release section, cylinders and the passage opening/closing means are controlled based on a controlled operation inputted to the sequence control unit.

14. The data writing apparatus for writing data to wireless IC tags according to claim 1, further comprising
a hopper section, an evacuation section for releasing wireless IC tags from the hopper section, a plurality of communication means and plural lines of passages corresponding to a number of the radio communication means,
wherein the plurality of radio communication means write data through radio communication to the plurality of wireless IC tags having been guided to the data writing region based on output signals from the radio communication means, and the wireless IC tag charging member charges the wireless IC tags having been written with data to the object to be embedded with wireless IC tags.

15. The data writing apparatus for writing data to wireless IC tags according to claim 1,
wherein the wireless IC tag embedded by the wireless IC tag charging member is a wireless IC tag to which data can be written through radio communication between itself and a radio communication means, and
the data writing apparatus further comprises
a ferroelectric memory that includes an electric power source section for receiving radio waves from the radio communication means and resonating therewith to thereby generate current, and
an antenna section for performing radio communication at a preset frequency bandwidth mounted to a substrate of the wireless IC tag so that the data can be received and stored in the ferroelectric memory, and
wherein the radio communication means is a radio communication unit that outputs radio waves in the range of the communication frequency band which is used for the wireless IC tag.

16. The data writing apparatus for writing data to wireless IC tags according to claim 1,
wherein the wireless IC tag embedded by the wireless IC tag charging member is a wireless IC tag which can write or read data through radio communication between itself and a radio communication means, and
the data writing apparatus further comprises
a ferroelectric memory that includes an electric power source section for receiving electric waves from the radio communication means and resonating therewith to thereby generate current, and an antenna section for performing radio communication at a preset frequency bandwidth, and
a UHF band communication antenna chip for receiving electric waves being in a range of UHF bandwidth electrically connected and mounted to a substrate of the wireless IC tag, and
wherein communication at a long frequency band exceeding the UHF band is performed with the antenna section of the ferroelectric memory so that the data is received and stored in the ferroelectric memory,
communication using electric waves in the range of UHF band is performed with an antenna chip for the UHF band communication, so that the data is received and stored in the ferroelectric memory included in the wireless IC tag, and
the radio communication means is a radio communication unit that outputs at least radio waves being in the range of UHF band.

17. The data writing apparatus for writing data to wireless IC tags according to claim 1,
wherein the wireless IC tag embedded by the wireless IC tag charging member is prepared by molding in any form of polygonal, spherical, or elliptic shape, so that it can freely roll and move.

* * * * *